(12) United States Patent
Baker et al.

(10) Patent No.: US 10,663,138 B2
(45) Date of Patent: May 26, 2020

(54) LIGHT REFLECTOR SYSTEMS AND METHODS

(71) Applicant: Valeo North America, Inc., Troy, MI (US)

(72) Inventors: Patton Davis Baker, Seymour, IN (US); Charles Crespin, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 356 days.

(21) Appl. No.: 15/655,506

(22) Filed: Jul. 20, 2017

(65) Prior Publication Data

US 2019/0024868 A1 Jan. 24, 2019

(51) Int. Cl.
*F21S 43/20* (2018.01)
*F21V 8/00* (2006.01)
(Continued)

(52) U.S. Cl.
CPC ............ *F21S 43/26* (2018.01); *B60Q 1/0058* (2013.01); *B60Q 1/2607* (2013.01); *F21S 43/13* (2018.01); *F21S 43/14* (2018.01); *F21S 43/239* (2018.01); *F21S 43/245* (2018.01); *F21S 43/31* (2018.01); *F21S 43/33* (2018.01); *F21S 43/40* (2018.01); *F21V 9/30* (2018.02); *G02B 6/001* (2013.01); *G02B 6/0005* (2013.01); *B60Q 1/24* (2013.01); *B60Q 1/30* (2013.01); *B60Q 1/34* (2013.01); (Continued)

(58) Field of Classification Search
CPC .. F21S 43/26; F21S 43/33; F21S 43/40; F21S 43/13; F21S 43/14; F21S 43/239; F21S 43/245; F21S 43/31; G02B 6/0005; G02B 6/001; F21V 9/30; B60Q 1/0058; B60Q 1/2607
See application file for complete search history.

(56) References Cited

U.S. PATENT DOCUMENTS 4,234,907 A 11/1980 Daniel
4,977,487 A 12/1990 Okano
(Continued)

FOREIGN PATENT DOCUMENTS

DE 10 2004 016 130 A1 10/2005
DE 10 2008 034 791 A1 1/2010
(Continued)

*Primary Examiner* — Thomas M Sember
(74) *Attorney, Agent, or Firm* — Oblon, McClelland, Maier & Neustadt, L.L.P.

(57) ABSTRACT

A light module includes a plurality of optical fibers configured as an optical fiber panel, wherein a first end of the plurality of optical fibers is configured into a bundle; a first solid state light source coupled to the bundle; a second solid state light source; and a reflector configured to reflect light rays transmitted from the second solid state light source towards the optical fiber panel. A method of transmitting light includes transmitting a first set of light rays, via a first solid state light source, to a plurality of optical fibers of an optical fiber panel, wherein the first solid state light source is coupled to the plurality of optical fibers; transmitting a second set of light rays, via a second solid state light source, towards a reflector; and reflecting the second set of light rays from the reflector towards the optical fiber panel.

16 Claims, 7 Drawing Sheets

(51) Int. Cl.
| | |
|---|---|
| *F21V 9/30* | (2018.01) |
| *F21S 43/40* | (2018.01) |
| *F21S 43/33* | (2018.01) |
| *B60Q 1/48* | (2006.01) |
| *B60Q 1/44* | (2006.01) |
| *B60Q 1/24* | (2006.01) |
| *B60Q 1/30* | (2006.01) |
| *B60Q 1/34* | (2006.01) |
| *F21S 43/245* | (2018.01) |
| *B60Q 1/00* | (2006.01) |
| *F21S 43/31* | (2018.01) |
| *F21S 43/14* | (2018.01) |
| *F21S 43/239* | (2018.01) |
| *F21S 43/13* | (2018.01) |
| *B60Q 1/26* | (2006.01) |
| *G02B 6/04* | (2006.01) |

(52) U.S. Cl.
CPC ............... *B60Q 1/44* (2013.01); *B60Q 1/48* (2013.01); *G02B 6/04* (2013.01)

(56) References Cited

U.S. PATENT DOCUMENTS

2009/0161378 A1  6/2009  Enz
2018/0252379 A1* 9/2018  Zozgornik ........... G02B 6/0001

FOREIGN PATENT DOCUMENTS

| DE | 10 2010 006 348 A1 | 8/2011 |
| DE | 10 2012 109 422 A1 | 4/2014 |
| DE | 20 2013 105 597 U1 | 5/2014 |
| FR | 2 997 354 A1 | 5/2014 |
| FR | 3 013 420 A1 | 5/2015 |
| WO | WO 2008/011558 A2 | 1/2008 |
| WO | WO2017032655 * | 2/2017 |

* cited by examiner

LIGHT REFLECTOR SYSTEMS AND METHODS

BACKGROUND

Motor vehicles contain numerous lighting devices for both interior and exterior illumination. For example, exterior vehicle lighting devices may perform stop lamp functions, tail lamp functions, headlamp functions, daytime running lamp functions, dynamic bending lamp functions, and fog lamp functions.

It is prudent for vehicle manufacturers to design vehicle lighting devices which meet the technical requirements of various standards around the world and in particular, in their associated marketing regions. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers can provide optional lighting effects (in addition to the required lighting functionality) to enhance a vehicle's illumination performance and styling.

It may be technically challenging to provide aesthetically appealing vehicle lighting devices while also meeting the necessary cost, technology, and regulatory requirements. For example, lighting provided by optical fibers may be aesthetically pleasing, but may not provide adequate lighting for higher intensity lighting requirements.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

Embodiments described herein include the following aspects.

(1) A light module including a plurality of optical fibers configured as an optical fiber panel, wherein a first end of the plurality of optical fibers is configured into a bundle; a first solid state light source coupled to the bundle; a second solid state light source; and a reflector configured to reflect light rays transmitted from the second solid state light source towards the optical fiber panel.

(2) The light module of (1), wherein the optical fiber panel is configured to allow the reflected light rays to travel through the optical fiber panel.

(3) The light module of either (1) or (2), wherein an optical fiber panel output comprises a combination of light transmitted from the first solid state light source to the plurality of optical fibers and the reflected light rays travelling through the optical fiber panel.

(4) The light module of any one of (1) through (3), wherein the second solid state light source is positioned between the optical fiber panel and the reflector within a curvature of the reflector.

(5) The light module of any one of (1) through (4), wherein the second solid state light source is separated from the first solid state light source.

(6) The light module of any one of (1) through (5), wherein the second solid state light source is positioned at or near to a focal point of the reflector.

(7) The light module of any one of (1) through (6), wherein the reflector is configured to reflect the transmitted light rays from the second solid state light source through the optical fiber panel.

(8) The light module of any one of (1) through (7), wherein the light module comprises an automotive light module.

(9) The light module of any one of (1) through (8), wherein the light module comprises a combination tail lamp and brake lamp automotive light module.

(10) The light module of any one of (1) through (9), wherein the light module comprises a combination parking lamp and daytime running lamp automotive light module.

(11) The light module of any one of (1) through (10), wherein the light module comprises a combination parking lamp and turn signal lamp automotive light module.

(12) The light module of any one of (1) through (11), wherein the light module comprises a combination tail lamp and turn signal lamp automotive light module.

(13) The light module of any one of (1) through (12), wherein the optical fiber panel comprises a lamination of one or more layers of optical fibers alternated with one or more layers of a transparent material.

(14) The light module of any one of (1) through (13), wherein the optical fiber panel further comprises a first C-channel support on a first laminated edge of the optical fiber panel and a second C-channel support on a second laminated edge of the optical fiber panel.

(15) The light module of any one of (1) through (14), wherein the reflector comprises a diffusive reflective material.

(16) The light module of any one of (1) through (15), wherein the light module is configured with circuitry to transmit a first light intensity in response to receiving a first signal and transmit a second light intensity in response to receiving a second signal, wherein the first light intensity differs from the second light intensity.

(17) A method of transmitting light including transmitting a first set of light rays, via a first solid state light source, to a plurality of optical fibers of an optical fiber panel, wherein the first solid state light source is coupled to the plurality of optical fibers; transmitting a second set of light rays, via a second solid state light source, towards a reflector; and reflecting the second set of light rays from the reflector towards the optical fiber panel.

(18) The method of transmitting light of (17), further including generating a combined optical fiber panel output of light generated from the plurality of optical fibers and the reflected second set of light rays travelling through the optical fiber panel.

(19) The method of transmitting light of either (17) or (18), wherein the generating is implemented via an automotive combination light module.

(20) The method of transmitting light of any one of (17) through (19), wherein the second solid state light source is positioned between the optical fiber panel and the reflector within a curvature of the reflector.

(21) The method of transmitting light of any one of (17) through (20), wherein the optical fiber panel comprises a lamination of one or more layers of optical fibers alternated with one or more layers of a transparent material.

(22) The method of transmitting light of any one of (17) through (21), wherein the reflector comprises a diffusive reflective material.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

Embodiments described herein provide lighting modules having a first solid state light source and a second solid state light source. As used herein, a solid state light source refers to a type of light source using an electroluminescence phenomenon in which a material emits light in response to passage of an electric current or in response to a strong electric field. Examples of light sources include, but are not limited to semiconductor light-emitting diodes (LEDs), organic light-emitting diodes (OLEDs), polymer light-emitting diodes (PLEDs), and monolithic light-emitting diodes (MLEDs). Lighting modules described herein can also include one or more bulb sources, such as a halogen light source or a high intensity discharge (HID) light source. Lighting modules described herein can also include a laser solid state light source module as described with reference to FIG. 6.

Figure 1:
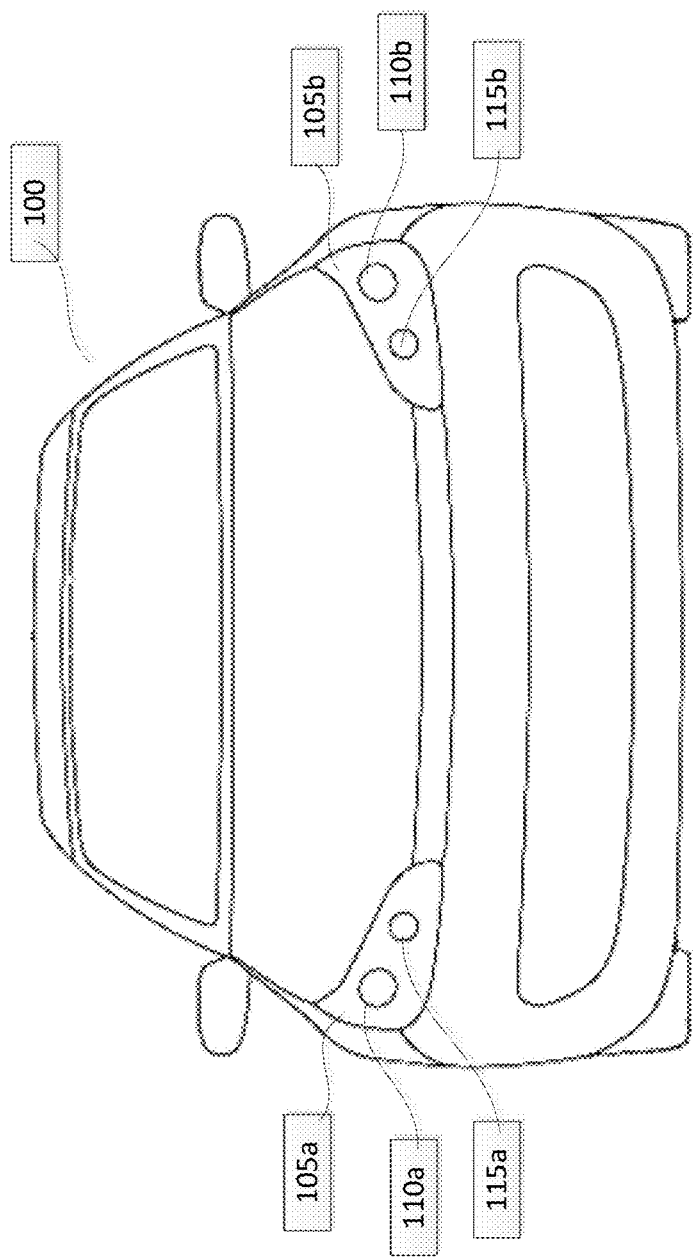
FIG. 1 illustrates a front-end of an exemplary motor vehicle according to one embodiment.

FIG. 1 illustrates a front-end of an exemplary motor vehicle 100. Motor vehicle 100 includes two headlamp assemblies 105a and 105b. Headlamp assemblies 105a and 105b include low beam headlamps 110a and 110b (also referred to as a lower or dipped beam) and high beam headlamps 115a and 115b (also referred to as a main or driving beam). Typically, the low beam headlamps 110a and 110b are used whenever another vehicle is on the road directly ahead of motor vehicle 100 and/or whenever another vehicle is approaching motor vehicle 100 from an opposite direction.

Figure 2:
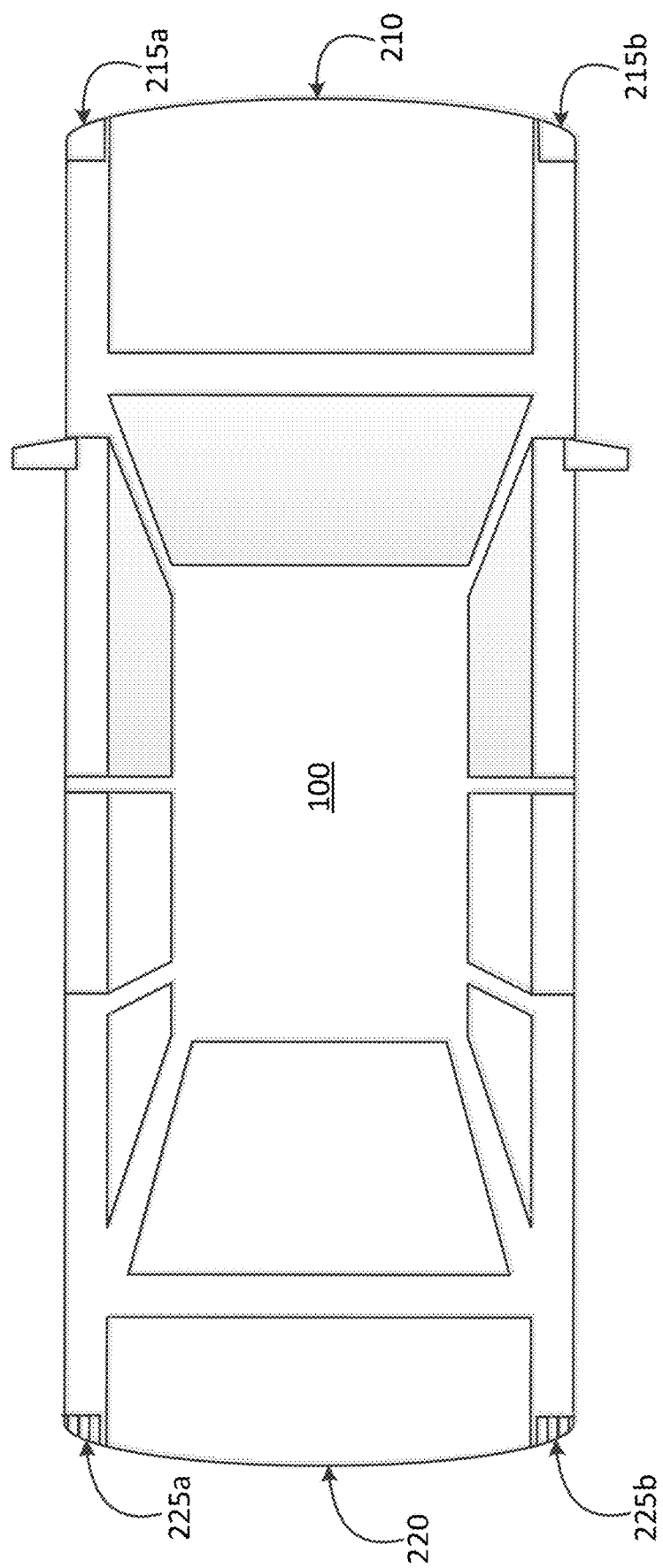
FIG. 2 illustrates a top view of a motor vehicle according to one embodiment.

FIG. 2 illustrates a top view of motor vehicle 100. A front end 210 and a back end 220 are illustrated. In addition to lighting functions, motor vehicle 100 illustrates signaling functions. Front lamp assemblies 215a and 215b represent signaling functions, such as a combination turn signal and parking lamp or a combination parking lamp and a daytime running lamp (DRL). Each of the front lamp assemblies 215a and 215b can be separate from headlamp assemblies 105a and 105b or they can be incorporated into the same assembly module.

FIG. 2 also illustrates rear lamp assemblies 225a and 225b. Rear lamp assemblies 225a and 225b represent signaling functions, such as a combination brake lamp and tail lamp or a combination tail lamp and a turn signal lamp. Each of the rear lamp assemblies 225a and 225b can include separate modules for each signaling lamp function or they can be incorporated into the same assembly module.

Most states, countries, or regions which utilize motor vehicles have various requirements and standards that a vehicle must adhere to in order to legally use roadways. For example, Federal Motor Vehicle Safety Standard (FMVSS) No. 108 specifies various maximum and minimum photometric intensity values (based on angle) for headlamps on vehicles operated within the Unites States. In addition to these requirements, the Insurance Institute for Highway Safety (IIHS) in the United States has its own set of tests and ratings (Headlight Test and Rating Protocol) for headlamp performance. The IIHS tests and ratings seek to encourage manufacturers to improve the illumination performance in actual on-road use. IIHS evaluations have shown that the on-road illumination provided by vehicle headlamps varies widely. In addition, IIHS has rated the majority of headlamps in a poor category (e.g. insufficient illumination, excessive glare, etc.).

Figure 3:
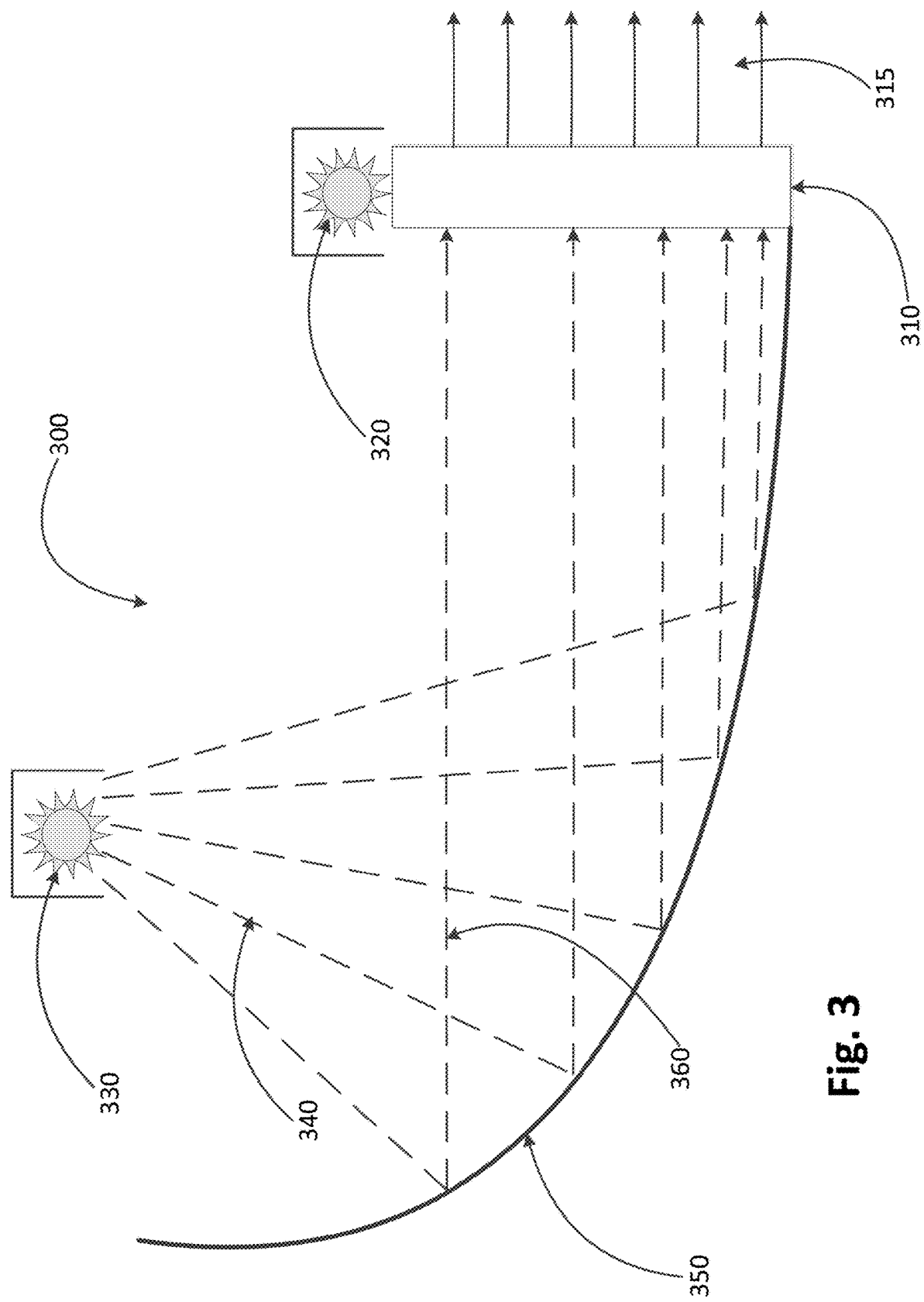
FIG. 3 illustrates a side view of an exemplary light module according to one embodiment.

FIG. 3 illustrates a side view of an exemplary light module 300 according to embodiments described herein. An optical fiber panel 310 includes alternating laminated layers of a plurality of optical fibers and a transparent material. The optical fiber panel 310 is described, in more detail herein with reference to FIGS. 4 and 5.

A first solid state light source 320, such as an LED is coupled to the optical fiber panel 310. In one embodiment, one end of the plurality of optical fibers is bundled together into a circular formation. Light rays from the first solid state light source 320 are directionally transmitted to each individual optical fiber within the optical fiber panel 310.

A second solid state light source 330, such as an LED or bulb is included in the light module 300. In one embodiment, the second solid state light source 330 is separate from the first solid state light source 320, as illustrated in FIG. 3. The light module 300 is configured with circuitry to transmit a first light intensity in response to receiving a first signal and transmit a second light intensity in response to receiving a second signal. In one embodiment, the first solid state light source 320 is a tail lamp and the second solid state light source 330 is a brake lamp. In a second embodiment, the first solid state light source 320 is a tail lamp and the second solid state light source 330 is a turn signal lamp. In a third embodiment, the first solid state light source 320 is a position lamp and the second solid state light source 330 is a turn signal lamp. In a fourth embodiment, the first solid state light source 320 is a position lamp and the second solid state light source 330 is a DRL.

Light rays 340 from the second solid state light source 330 are directionally transmitted downward in FIG. 3 towards a reflector 350. In one embodiment, the second solid state light source 330 is located at a focal point of the reflector 350. The reflector 350 can be made of a reflective material or have a reflective material coated to a base of the reflector 350. In one embodiment, the reflector 350 is made of a diffused reflective material, such as polycarbonate or other white diffusive material. Diffusive reflections reduce the risk of a non-uniform appearance, whereas a metalized surface or specular surface can create bright spots. In a second embodiment, the reflector 350 can have a metallized coating. When the light rays 340 hit the reflector 350, reflected light rays 360 are directed towards the optical fiber panel 310 by the curvature of the reflector 350. In one embodiment given for illustrative purposes only, the reflector 350 is approximately 10-80 mm in length and 5-50 mm in width. The distance from the second solid state light source 330 to the focal point of the reflector 350 is approximately 10-100 mm.

FIG. 3 illustrates a side view of light module 300. However, light module 300 is not limited to any particular orientation when implemented within a vehicle. For example, the first solid state light source 320 can be oriented to either an inner side or an outer side relative to the vehicle, or in a front end direction or a back end direction relative to the vehicle, or in a top side or a bottom side relative to the vehicle.

The curvature of the reflector 350 determines the angles between each pair of a light ray 340 and a reflected light ray 360. The curvature of the reflector 350 is determined such that each reflected light ray 360 is directed towards the optical fiber panel 310. In one embodiment, the reflector 350 is located as close to the optical fiber panel 310 as is practical to increase the efficiency of the reflected light rays 360. An objective of embodiments described herein is that a maximum percentage of light entering the optical fiber panel 310 leaves the optical fiber panel 310 in a desired direction in an effort towards reaching 100% efficiency.

In a second embodiment, the second solid state light source 330 is positioned above the optical fiber panel 310 and is positioned at a focal point of the reflector 350. The position of the second solid state light source 330, the position and curvature of the reflector 350, and the position and length of the optical fiber panel 310 are determined such that the reflected light rays 360 are directed towards the optical fiber panel 310 to provide an optimum amount of reflected light rays 360 to the optical fiber panel 310. Emitted light rays 315 are a combination of transmitted light rays from the first light source 320 and reflected light rays 360 from the second light source 330 travelling through the optical fiber panel 310.

An objective of embodiments described herein is to provide a uniform light output appearance from each light module. A fiber optic panel source can provide adequate lighting for perimeter lighting. A fiber optic panel source can also provide adequate lighting for a tail lamp. However, a fiber optical panel source may not provide adequate lighting for a brake lamp. For example, a brake lamp may have a light intensity twenty orders of magnitude higher than a tail lamp. For example, a brake lamp may have 80 candela and a tail lamp may have 4 candela. In addition, it array be desirable to have a tail lamp and a brake lamp located within the same light module cavity.

Embodiments described herein provide a combination light module in which adequate lighting is produced for a high light-intensive lamp, such as a brake lamp and still provide a fiber optic panel visual appearance of a low light-intensive lamp, such as a tail lamp. Therefore, in one embodiment, a tail lamp and a brake lamp can be provided within the same light module cavity and meet regulatory standards using embodiments described herein. In an example given for illustrative purposes only, a tail lamp may be illuminated via the first solid state light source 320, whereas a brake lamp may be illuminated via the second solid state light source 330 and/or the first solid state light source 320. In addition, a frequency of either light source can be adapted. For example, an applied frequency of 50% to a light source results in a 50% reduction in its full brightness.

A second embodiment described herein includes a combination parking lamp and daytime running lamp. A daytime running lamp is typically on at all times of vehicle operation, except when the headlamps are activated on a low beam or a high beam. A combination light module is provided in which adequate lighting is produced for a high light-intensive lamp, such as a daytime running lamp and still provide a fiber optic panel visual appearance of a low light-intensive lamp, such as a parking lamp. In addition, the daytime running lamp and the parking lamp are configured within the same light module.

The light intensities of the first solid state light source 320 and the second solid state light source 330 can be varied to achieve the required regulatory standards and a desirable appearance. A daytime running lamp is typically brighter than a parking lamp. In order to accommodate a desirable illuminance of both lamps, the intensities of either the first solid state light source 320 or the second solid state light source 330 can be varied from no intensity to a full 100% intensity or anything in between. A primary source (i.e. first solid state light source 320) serves a lower function and a secondary source (i.e. second solid state light source 330) serves a higher function. If the primary source cannot achieve a lower function alone, the secondary source can also be activated (in full or in part) to achieve the desired intensity.

A third embodiment described herein includes a combination turn signal lamp and parking lamp. A combined light module is provided in which adequate lighting is produced for a high light-intensive lamp, such as a turn signal lamp and still provide a fiber optic panel visual appearance of a low light-intensive lamp, such as a parking lamp. In addition, the turn signal lamp and the parking lamp can be configured within the same light module. The light intensities of either the first solid state light source 320 and/or the second solid state light source 330 can be varied to achieve the required regulatory standards and a desirable appearance.

A fourth embodiment described herein includes a combination tiara signal lamp and a tail lamp. A combined light module is provided in which adequate lighting is produced for a high light-intensive turn signal lamp and a low light-intensive tail lamp. In addition, the turn signal lamp and the tail lamp can be configured within the same light module. The light intensities of either the first solid state light source 320 and/or the second solid state light source 330 can be varied to achieve the required regulatory standards and a desirable appearance.

Figure 4:
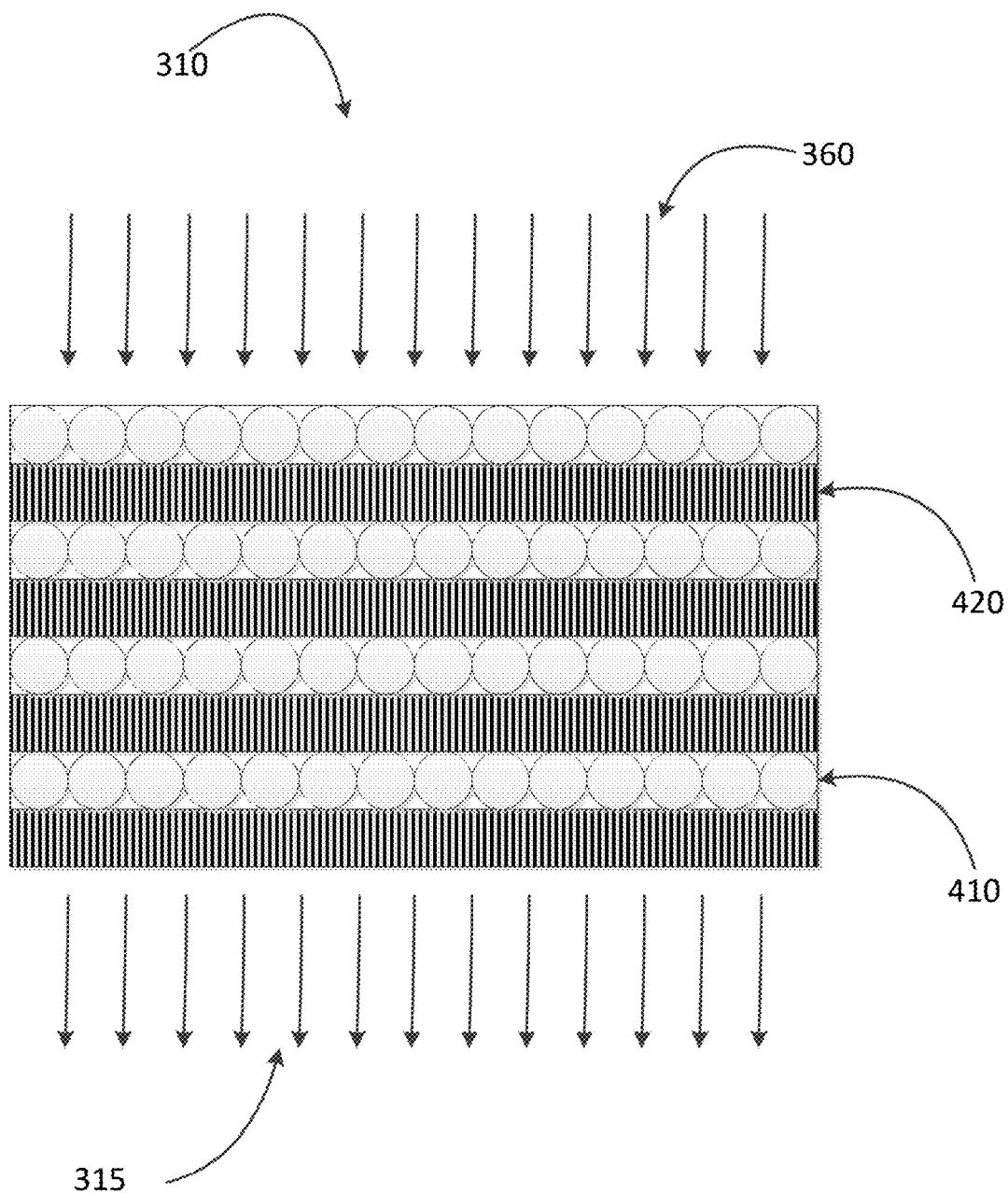
FIG. 4 illustrates a cross-sectional view of the optical fiber panel according to one embodiment.

FIG. 4 illustrates a cross-sectional view of the optical fiber panel 310. The optical fiber panel 310 includes a lamination of one or more layers f optical fibers 410 alternated with one or more layers of a transparent material 420. In an example given for illustrative purposes only, one to five stacked combination layers of an optical fiber layer 410 and a transparent material layer 420 can be used in the optical fiber panel 310. In particular, three stacked combination layers can be used in the optical fiber panel 310. Parameters for the optical fiber panel 310 include, but are not limited to the length, width, number of light sources, and a desired flux. One or more, of the parameters can be driven by customer requirements. For example, parameters for a length and/or a width may be defined by a customer, and a given regulation determines the flux. In response, the number of light sources and/or the number of stacked combination layers of the optical fiber panel 310 can be determined.

In one embodiment, the transparent material 420 is a polyester substrate. In a second embodiment, the transparent material 420 is a polycarbonate material. However, other diffusive materials that are transparent, can provide some structural support to adjacent, layers of optical fibers 410, and can be adhered on either side to an adjacent optical fiber layer 410 are contemplated by embodiments described herein. In one embodiment, a glue that is designed for a light module environment can adhere the laminated layers together, such as a pressure sensitive adhesive.

The composition of the optical fiber panel 310 allows reflected light rays 360 from the second solid state light source 330 to travel through the optical fiber panel 310 to the other side as emitted light rays 315. The emitted light rays 315 also include light rays from the optical fibers of the optical fiber panel 310 illuminated by the first solid state light source 320. An exemplary composition for the optical fibers of the optical fiber panel 310 is poly methyl methacrylate (PMMA). However, other compositions and materials for the optical fibers are contemplated by embodiments described herein.

Figure 5:
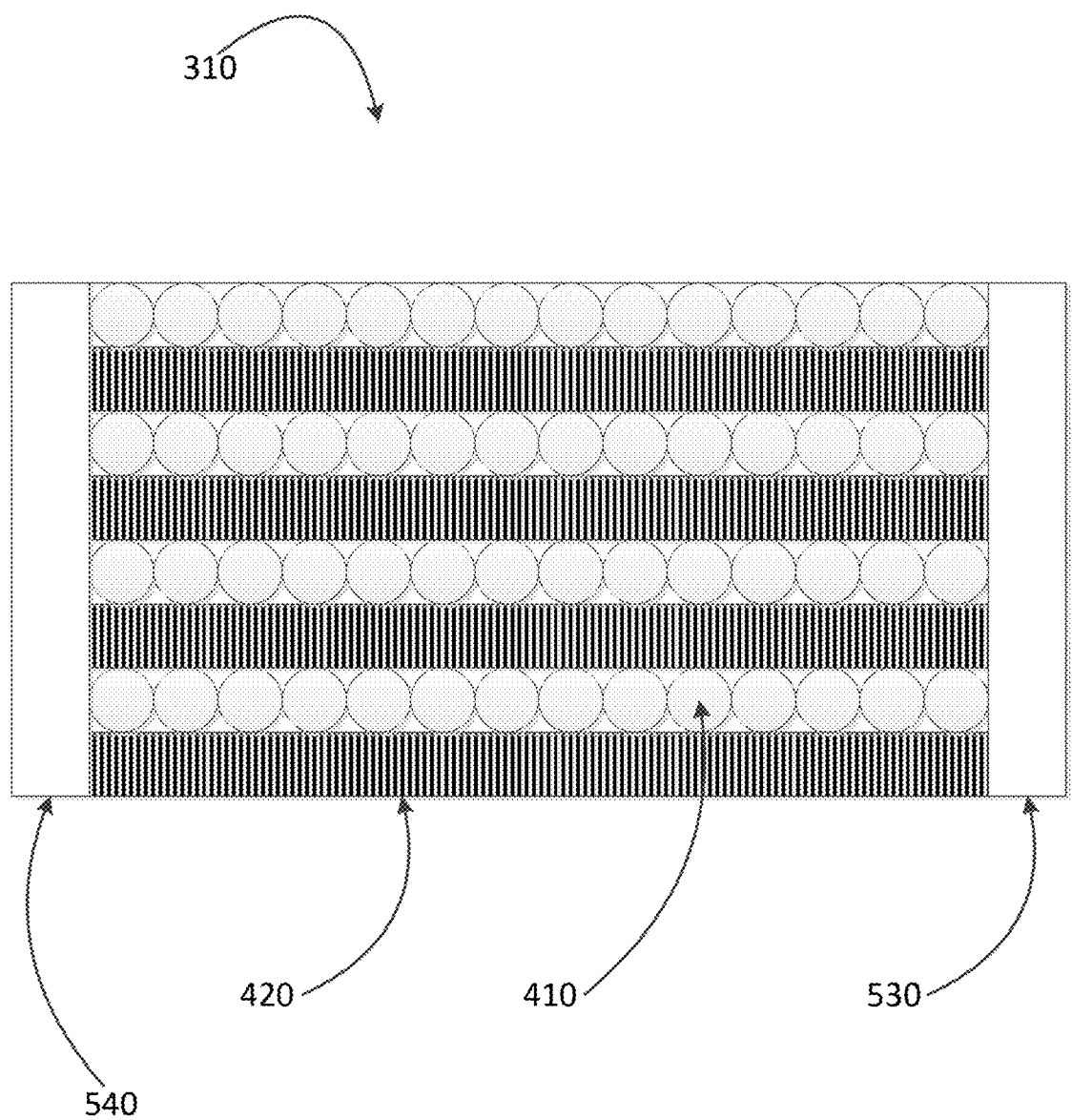
FIG. 5 illustrates a cross-sectional view of the optical fiber panel with a right C-channel support and a left C-channel support according to one embodiment.

FIG. 5 illustrates a cross-sectional view of the optical fiber panel 310 with a right C-channel support 530 and a left C-channel support 540. Each of the right C-channel support 530 and the left C-channel support 540 provide mechanical strength and rigidity to the optical fiber panel 310. In one embodiment, one of the C-channel supports 530 or 540 is in a circular configuration so as to couple the optical fiber layers 410 with the first solid state light source 320.

In some embodiments, an optical fiber panel has a plurality of optical fibers configured to emit light along a respective length of the optical fiber, wherein the optical fibers are arranged to define an illumination region such that a first and a second light is output from the illumination region.

Figure 6:
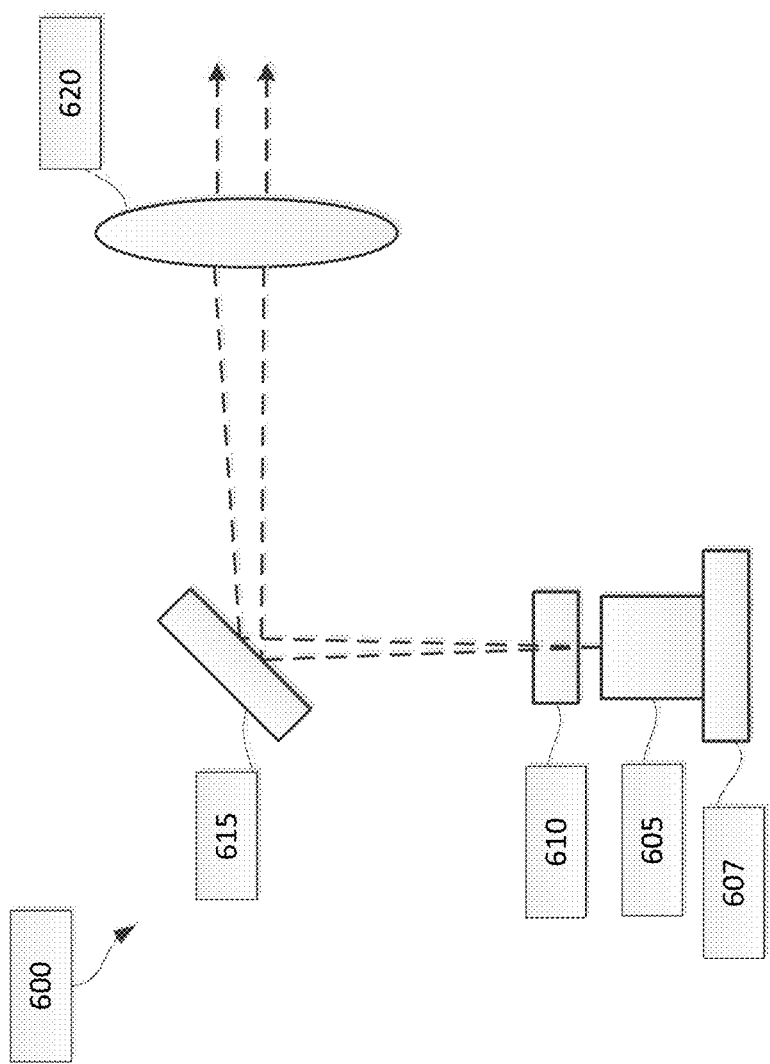
FIG. 6 illustrates a functional block diagram of an exemplary laser solid state light source module according to one embodiment.

FIG. 6 illustrates a functional block diagram of an exemplary laser solid state light source module 600, which includes a laser emitter 605, a phosphor plate 610, a mirror 615, and a lens 620. Laser emitter 605 may, in some implementations, include a laser solid state light source with emission in the blue visible spectrum (for example, with a wavelength in the range of 360 and 480 nm). Laser emitter 605 can, in some embodiments, be mounted on a heatsink 607.

The light from laser emitter 605 is directed through phosphor plate 610. Phosphor plate 610 can include phosphors such as, but not limited to, YAG, LuAG, nitride, oxy-nitride, and the like. Phosphor plate 610 converts the light from laser emitter 605 to a white light. In place of phosphor plate 610, laser emitter 605 can be coated with a phosphor layer of similar materials.

The light from laser emitter 605 is reflected by mirror 615. Mirror 615 can, in some embodiments, include actuators and/or vibrators configured to broaden or tailor the shape of the light beam from laser emitter 605. The light reflected from mirror 615 passes through lens 620. Other components can be employed in laser solid state light source module 600 to detect failure of phosphor plate 610 or mirror 615 to ensure the safety of laser solid state light source module 600.

Figure 7:
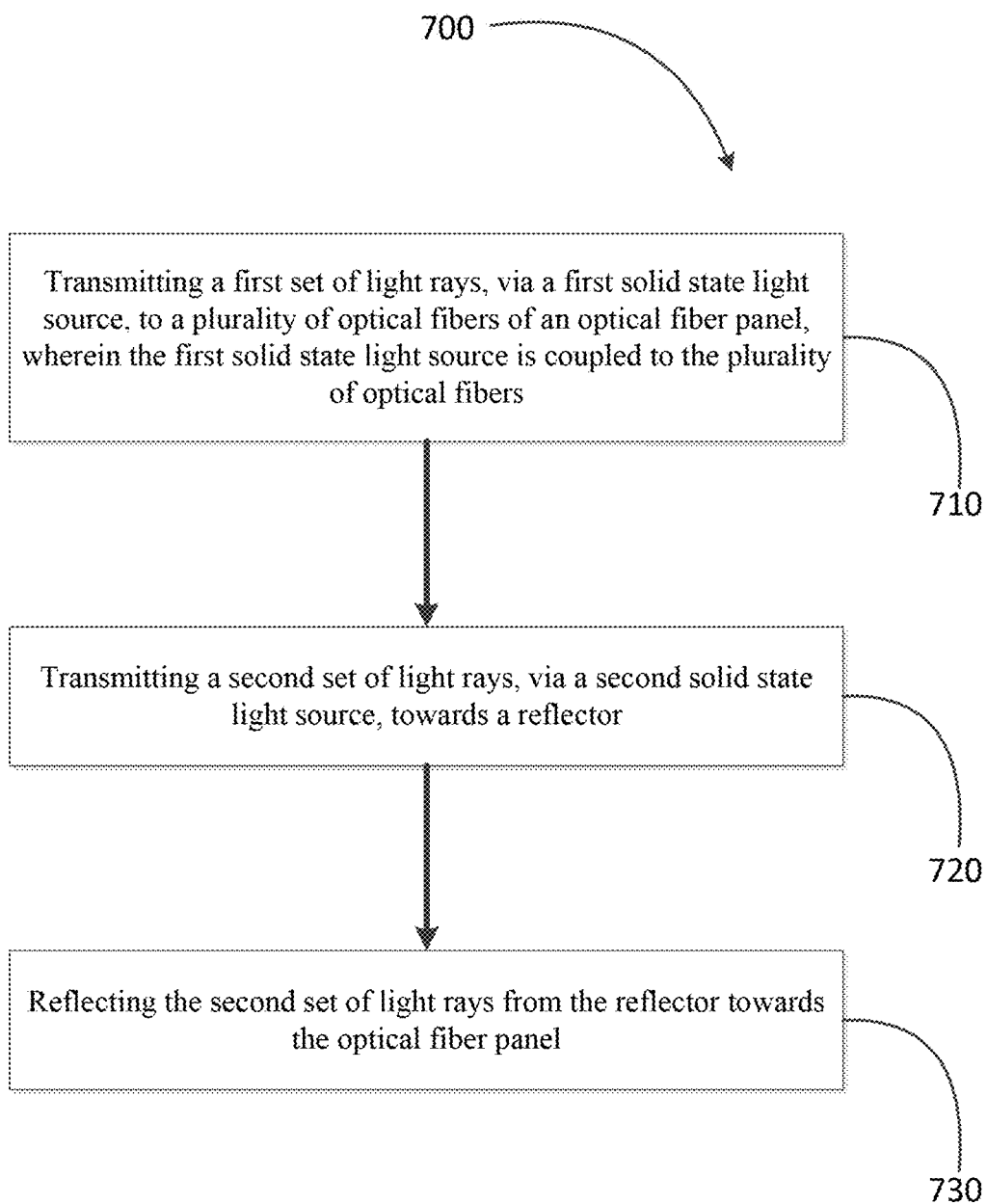
FIG. 7 is a flowchart for an exemplary method of transmitting light according to one embodiment.

FIG. 7 is a flowchart for an exemplary method 700 of transmitting light. In step 710, a first set of light rays are transmitted, via a first solid state light source, to a plurality of optical fibers of an optical fiber panel. The first solid state light source is coupled to the plurality of optical fibers.

In step 720, a second set of light rays are transmitted, via a second solid state light source, towards a reflector. In one embodiment, the first solid state light source is separate from the second solid state light source.

In step 730, the second set of light rays is reflected from the reflector towards the optical fiber panel. In one embodiment, the second set of light rays is transmitted into a curvature of the reflector.

Embodiments described herein provide several advantages. Light module systems described herein provide a light module for a high light-intensive lamp in combination with a low light-intensive lamp within the same light module cavity. The total light intensity is managed as an optical panel and a reflector system that are physically coupled together. As a result, each source can be varied in intensity to achieve a desired output. A high light-intensive lamp, such as a brake lamp, a daytime running lamp, and a turn signal lamp cannot meet certain regulatory standards with an optical fiber panel. Therefore, the aforesaid lamps typically need to be implemented with a direct light source, such as an LED light source. Even though regulatory standards can be achieved with a direct light source, it does not have the appeal of an optical fiber panel. In addition, the direct light source does not match other optical fiber panels present on the vehicle.

Embodiments described herein provide a light module in which both a high light-intensive lamp and a low light-intensive lamp are present within the same light module cavity. In addition, the light module has a single optical fiber panel appearance while also providing, light intensities that meet regulatory standards of both lamps. Exemplary combination light modules include, but are not limited to a brake lamp and tail lamp combination, a daytime running lamp and parking lamp combination, a turn signal lamp and tail lamp combination, and a turn signal lamp and parking lamp combination.

While certain embodiments have been described herein, these embodiments are presented by way of example only, and are not intended to limit the scope of the disclosure. Using the teachings in this disclosure, a person having ordinary skill in the art can modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure,

The invention claimed is:

1. An automotive light module, comprising:
    a plurality of optical fibers configured as an optical fiber panel, wherein a first end of the plurality of optical fibers is configured into a bundle;
    a first solid state light source coupled to the bundle;
    a second solid state light source; and
    a reflector configured to reflect light rays transmitted from the second solid state light source towards the optical fiber panel, wherein the second solid state light source is positioned between the optical fiber panel and the reflector within a curvature of the reflector.

2. The light module of claim 1, wherein the optical fiber panel is configured to allow the reflected light rays to travel through the optical fiber panel.

3. The light module of claim 2, wherein an optical fiber panel output comprises a combination of light transmitted from the first solid state light source to the plurality of optical fibers and the reflected light rays travelling through the optical fiber panel.

4. The light module of claim 1, wherein the second solid state light source is positioned at or near to a focal point of the reflector.

5. The light module of claim 1, wherein the light module comprises a combination tail lamp and brake lamp automotive light module.

6. The light module of claim 1, wherein the light module comprises a combination parking lamp and daytime running lamp automotive light module.

7. The light module of claim 1, wherein the light module comprises a combination parking lamp and turn signal lamp automotive light module.

8. The light module of claim 1, wherein the light module comprises a combination tail lamp and turn signal lamp automotive light module.

9. The light module of claim 1, wherein the optical fiber panel comprises a lamination of one or more layers of optical fibers alternated with one or more layers of a transparent material.

10. The light module of claim 9, wherein the optical fiber panel further comprises a first C-channel support on a first laminated edge of the optical fiber panel and a second C-channel support on a second laminated edge of the optical fiber panel.

11. The light module of claim 1, wherein the reflector comprises a diffusive reflective material.

12. The light module of claim 1, wherein the light module is configured with circuitry to transmit a first light intensity in response to receiving a first signal and transmit a second light intensity in response to receiving a second signal, wherein the first light intensity differs from the second light intensity.

13. A method of transmitting light through an automotive light module, the method comprising:
    transmitting a first set of light rays, via a first solid state light source, to a plurality of optical fibers of an optical fiber panel, wherein the first solid state light source is coupled to the plurality of optical fibers;
    transmitting a second set of light rays, via a second solid state light source, towards a reflector, wherein the second solid state light source is positioned between the optical fiber panel and the reflector within a curvature of the reflector; and
    reflecting the second set of light rays from the reflector towards the optical fiber panel.

14. The method of claim 13, further comprising:
    generating a combined optical fiber panel output of light generated from the plurality of optical fibers and the reflected second set of light rays travelling through the optical fiber panel.

15. The method of claim 13, wherein the optical fiber panel comprises a lamination of one or more layers of optical fibers alternated with one or more layers of a transparent material.

16. The method of claim 13, wherein the reflector comprises a diffusive reflective material.

* * * * *